United States Patent [19]

Marocco

[11] Patent Number: 4,640,850
[45] Date of Patent: Feb. 3, 1987

[54] COMPOSITE SLAB INCORPORATING A SHEET OF MARBLE OR SIMILAR NATURAL STONE, FOR THE FORMATION OF FACINGS FOR BUILDING, INTERIOR DECORATION AND THE LIKE

[75] Inventor: Giuseppe Marocco, Turin, Italy

[73] Assignees: Technomarmi Maiera S.p.A.; Seifag S.r.l., both of Italy

[21] Appl. No.: 679,089

[22] Filed: Dec. 6, 1984

Related U.S. Application Data

[62] Division of Ser. No. 486,172, Apr. 18, 1983, abandoned.

[51] Int. Cl.[4] .............................. B05D 5/00; B44F 9/04
[52] U.S. Cl. ............................................. 428/15; 52/612; 428/49; 428/172; 428/173; 428/426; 428/437
[58] Field of Search .................. 428/15, 172, 173, 437, 428/49, 542.2, 542.4, 542.6, 426; 52/612

[56] References Cited

U.S. PATENT DOCUMENTS

| 1,025,677 | 5/1912 | Brunet | 428/15 |
| 3,530,442 | 11/1970 | Buckley et al. | 156/306.6 |
| 4,218,496 | 8/1980 | Savignac | 428/15 |

FOREIGN PATENT DOCUMENTS 20 of 1876 United Kingdom ................. 428/15

Primary Examiner—George F. Lesmes
Assistant Examiner—P. R. Schwartz
Attorney, Agent, or Firm—Sughrue, Mion, Zinn, Macpeak, & Seas

[57] ABSTRACT

A composite facing slab comprises a sheet of natural stone, such as marble, and a protective layer constituted by a sheet of transparent glass. The latter is fixed to the face of the stone sheet intended to remain visible with the interpositioning of an interlayer of transparent thermoplastics material which can adhere to both the sheets and fills the surface defects (pores, cavities, cracks and the like) of the stone sheet.

3 Claims, 2 Drawing Figures

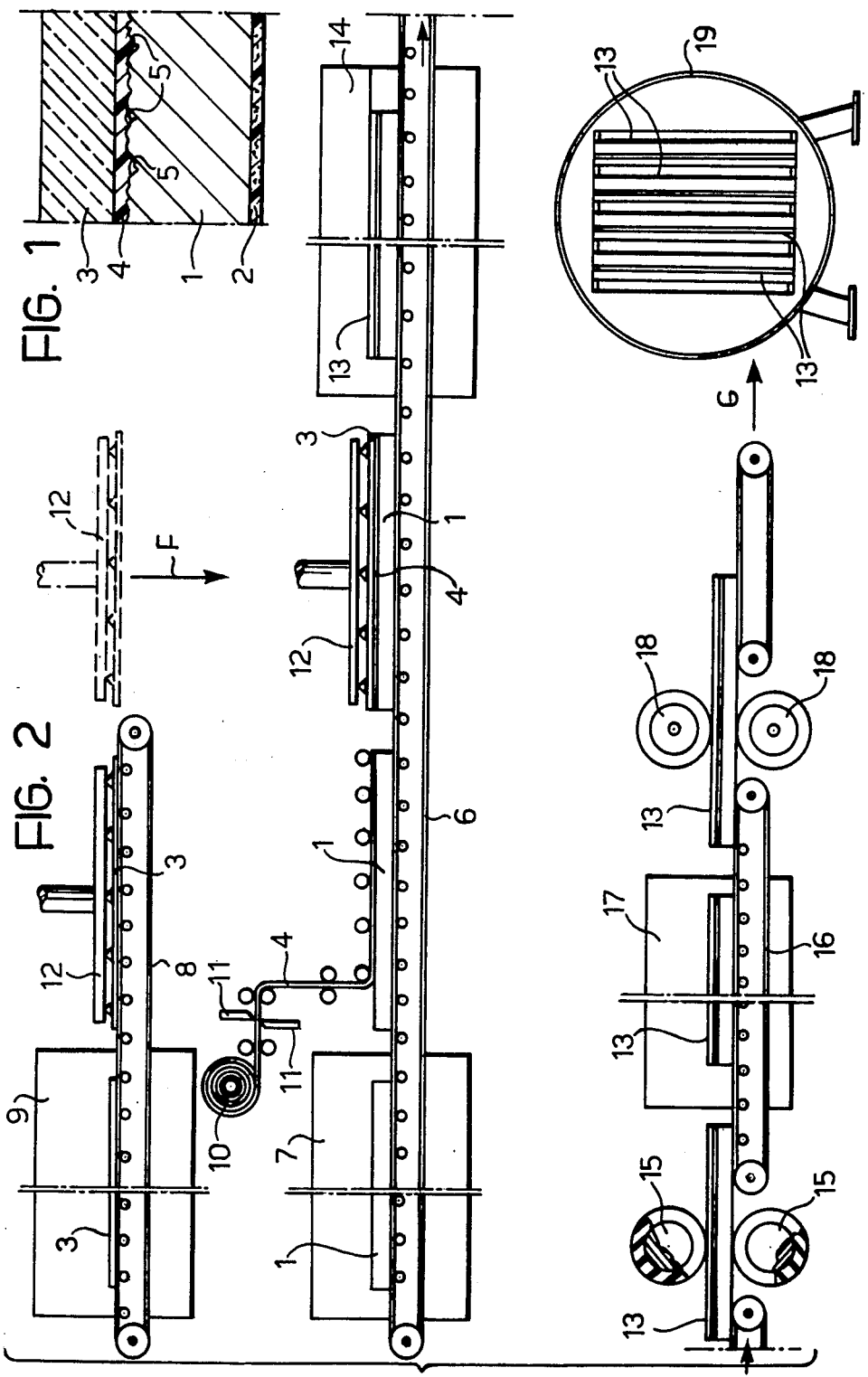

COMPOSITE SLAB INCORPORATING A SHEET OF MARBLE OR SIMILAR NATURAL STONE, FOR THE FORMATION OF FACINGS FOR BUILDING, INTERIOR DECORATION AND THE LIKE

This is a division of application Ser. No. 486,172, filed Apr. 18, 1983, now abandoned.

The present invention relates to a composite slab for the formation of facings for building, interior decoration and the like, incorporating a sheet of marble or similar natural stone.

It is known that marble and other ornamental stones, used in the form of sheets for facings in the building industry, interior decoration and other fields, are expensive.

Their high costs are contributed to by the fact that perfectly sound materials of this type are rare: the blocks from which the sheets are forced inevitably have internal flaws, such as cavities, cracks and the like, which are met as surface defects in the sheets obtained, if they do not actually cause breakage into several pieces.

The formation of sheets from a single block free from flaws, and defective or broken sheets, increases enormously the market price of the former, while the latter may be improved qualitatively or recovered by various methods of stuccoing and gluing but still remain a less valued material.

Despite their high costs, sheets of marble and other ornamental stones are materials which are susceptible to weathering. The chemical and physical attack of atmospheric agents degrades the surfaces of the sheets more or less slowly, especially if external facings are considered. As everyone knows, this phenomenon has been increasing dramatically in recent years because of atmospheric pollution, but entirely natural causes, such as the salinity of the air close to the sea, also exist.

Only rarely does the marble facade of a building retain its original fine appearance after several years and, in order to restore this appearance, expensive renovation methods from which many abstain are necessary. Since a polished marble would lose its polished appearance very quickly under the action of atmospheric agents, marbles with rough or smooth but not polished surfaces are used for external facings, thus renouncing a valuable property of marble.

In addition to attack by atmospheric agents, marble and like facings are subject to vandalism. Buildings in cities are always being defaced by graffiti made, for the most part, with spray paints. Marble and other stones, because of their natural micro-porous nature, become impregnated to a greater or lesser depth by these paints, whereby vigorous cleaning with a solvent does not suffice to remove them: in order to remove them totally, it is necessary to remove a surface layer of greater or lesser thickness from the sheet by abrasion. This working is expensive and again many will not undertake it, all the more since they know that other vandals will inevitably deface the facing again sooner or later.

The high cost of sheets of marble or other ornamental stones is also contributed to by the fact that one is dealing with materials made extremely fragile by very frequent flaws in the form of structural discontinuities in the sheets, which may not be visible to the naked eye. Whatever precautions are taken in the transport and positioning of the sheets, a certain percentage of breakages inevitably occurs with a consequent increase in costs. Recently, a process has been developed which allows very thin sheets of marble and similar natural stones to be obtained economically from blocks even when defective, the thickness of the sheets being less than 10 mm and possibily down to 4 mm. This process is described in U.S. Pat. No. 4,177,789, in the name of the inventor designated in the present application.

The thin sheets in question, obtained by this process, as a result have, on the "rear" face intended to remain concealed, a reinforcing or supporting layer of high tensile strength which is usually constituted by a glass-fibre-reinforced resin. The resin penetrates the cracks and structural discontinuities in the sheets, improving their compression strength and thus making them more reliable than conventional sheets.

In the structural calculations relating to the conventional sheets, the sheets themselves are attributed with no tensile strength. The glass-fibre reinforcement, however, gives the thin sheets a very good tensile strength on the "rear" face. However, this solves only part of the problem of the bending strength. Indeed, this latter is best if the sheet is bent in the direction in which the reinforcing layer is put under tension and the stone sheet under compression, but if the bending is in the opposite direction the stone sheet, being put under tension, may still split, especially if there are structural discontinuities therein.

The problem behind the present invention is that of forming a slab of marble or other ornamental stone having the following qualities:

aesthetic qualities equal to those of sheets free from surface defects even if these defects exist;

no susceptibility to weathering by atmospheric chemical and physical agents, with the result that degradable stone materials which could not be used until now may be used for applications such as facade facings;

non-corrodible and impregnable by various substances, especially liquids, with the consequent possibility of cladding the tops of work benches, tables and other pieces of furniture with sheets which cannot be indelibly stained;

uniformly polished appearance which can be restored by simple washing if there are deposits of dust or other substances;

extreme facility for removal of paints by the use of a suitable solvent, and very good tensile strength and bending strength, giving good bending strength in both directions when a sheet has a reinforcing layer on its "rear" face.

According to the present invention, this problem is solved by means of a composite facing slab incorporating a sheet of marble or similar natural stone, characterised essentially in that a protective layer constituted by a sheet of transparent glass is applied to the face of the stone sheet intended to be visible, the glass sheet being fixed to the stone sheet with the interpositioning of an interlayer of transparent thermoplastics material which can adhere to both sheets and fills the surface defects (pores, cavities, cracks and the like) in the stone sheet.

By virtue of this idea, a composite slab is obtained which satisfies all the requirements mentioned above.

The reason for a glass-marble bonding lies with their almost identical coefficients of expansion. The coefficient of expansion of glass is about $8.10^{-6}$ per C degree, while that of marble is about $7.10^{-6}$ per C degree.

The filling of the surface defects with transparent plastics material achieves "stuccoing" of the surface intended to remain visible. Since this stuccoing is effected with a transparent material, this material is not perceptible because, what is seen of the stone sheet through the glass sheet is, by virtue of refraction, the "bottom" of the defects, that is, the stone itself, which is seen as if its surface were perfectly smooth. In other words, the surface of the marble or other stone appears to be brought, by virtue of refraction, to the outer surface of the glass sheet and the observer is unable to discern the distance of the pattern (veining and the like) of the stone from the surface of the glass.

It is unnecessary to point out that the glass is a material which has very little susceptibility to weathering by chemical and physical atmospheric agents and that this quality is transferred to the underlying natural stone. Naturally, the transparent thermoplastics material must be of the type which is substantially undegradable by light. A preferred material from this point of view is polyvinyl butyrate.

It is also unnecessary to note that glass is a material with a good polish, whereby a sheet of glass gives the underlying stone sheet a permanently clear appearance, except when there are deposits of dust or other material. These deposits may be removed in the same manner as one cleans, for example, the glass of windows, that is, simply by water with perhaps the addition of a detergent, or by one of the numerous products on the market for cleaning glass.

It is equally easy to clean remove paint from the glass surface of the composite slab since, as is known, the bonding of paint to glass is very poor and in many cases it can be removed with a simple scraper. It is equally easy to remove deposits of white-wash or similar material, as well as writing done with chalk or a pencil.

Normal window glass has considerable tensile strength (about 400 Kg/cm$^2$ and this strength is transmitted to the marble or other underlying stone through the interlayer of thermoplastics material. As a result, the bending strength of the composite slab is improved, particularly if the bending is imparted in the direction in which the glass sheet is put under tension. If the marble sheet then has a reinforcing layer of good tensile strength on its "rear" face, opposite that which is coated by the glass sheet, a slab having good bending strength in both directions is obtained. This quality is essential for slabs used as external facings which must resist wind action which may involve both increases and decreases of pressure.

The invention also relates to a process for manufacturing a composite slab of the said type. This process is characterised essentially in that a sandwich is formed comprising a sheet of natural stone, such as marble, a sheet of glass, and an intercolated film of transparent thermoplastics material which can adhere to both sheets after its thermo-softening, and the sandwich is subjected to a gluing treatment consisting of heating it in a pressurised environment to a temperature such as to soften the thermoplastics material to cause its adhesion to the two sheets and its deep penetration of the surface defects (pores, cavities, cracks and the like) in the stone sheet, and subsequently cooling it to below this temperature.

In the whole of the present description and claims, the term "glass" includes any type of sheet glass, from common drawn glasses to so-called crystals.

The invention will be more clearly understood from the detailed description which follows with reference to the appended drawings, in which:

FIG. 1 is a partial schematic section on an enlarged scale of a composite slab according to the invention, and FIG. 2 is a schematic representation of a plant for manufacturing composite slabs like that of FIG. 1.

In FIG. 1, a sheet of marble or similar natural ornamental stone is indicated 1. This sheet may be very thin, such as that obtained by the process described and illustrated in the U.S. Pat. No. 4,177,789 mentioned above. The sheet 1 obtained by the process may have a thickness less than 10 mm (normally from 4 to 7 mm).

The "rear" face of sheet 1, intended to be fixed to a surface to be faced, such as, for example, the facade of a building, is coated with a reinforcing layer 2 of good tensile strength. The reinforcing layer 2 is preferably constituted by a synthetic resin (normally an epoxy resin) reinforced with glass fibres.

To the opposite face of the sheet 1, intended to remain visible, is applied a protective layer constituted by a sheet 3 of transparent glass. The glass sheet 3 is fixed to the sheet 1 of marble or the like by means of an interlayer 4 of transparent thermoplastics material. As may be seen, the interlayer 4 fills the inevitable surface defects 5 (pores, cavities, cracks and the like) in the sheet 1.

The thickness of the glass sheet 3 may be of the order of several millimetres. The thickness of the interlayer 4, however, may be of the order of several tenths of a millimeter.

As will be stated below, the interlayer 4 is obtained from a film the thickness of which is chosen to advantage in dependence on the greater or lesser degree of defectiveness of the surface of the sheet 1 intended to remain visible or on the requirements of structural co-operation between the two rigid elements (glass and marble). The deeper the defects 5 the greater will be the thickness of the film of thermoplastics material.

The thermoplastics material which is preferred for its good adhesive properties in the thermo-softened state, both with regard to the marble or other stone and the glass, is polyvinyl butyrate. This material has the valued property of being unchanged by light.

Usually, a colourless glass and colourless polyvinyl butyrate or other equivalent thermoplastics material is used. In this case, the appearance of the composite slab is that of the marble or other stone after prefect polishing, which in this case is given by the smooth outer surface of the glass. Indeed, it is possible to give a permanent polished appearance to a porous marble which is difficult if not impossible to polish by normal processes.

It is also possible to use a marble with a not very agreeable colour for the sheet 1 and to correct the colour by the use of a transparent interlayer 4 which is coloured in the desired manner. The glass 3 could also be coloured, although coloured glasses are more expensive than uncoloured glasses. It is possible, for example, to whiten a greyish marble by using an interlayer 4 of polyvinyl butyrate containing a "lightening" filler.

In order to obtain particular decorative effects, it is possible to insert thin foils of other materials (metal, paper and the like) above or below the interlayer between the marble and the glass, but not located close to the edges and of dimensions such as not to compromise the adhesion between the marble and the glass.

The preferred process for forming a composite slab having the structure illustrated in FIG. 1 will now be described.

First of all, there is provided a sheet 1 of marble or the like with a reinforcing layer 2, and a glass sheet 3 of substantially the same dimensions as the marble sheet.

To advantage the marble or the like sheets are left rough-cut or sawn even on their faces intended to remain visible.

They may, however, be smoothed. If the finished composite slabs must have a definite thickness, the smoothing of the marble sheets will be carried out so as to determine the thickness.

The two sorts of sheets are subjected to vigorous preliminary washing.

The subsequent operations are performed by a plant such as that illustrated schematically in FIG. 2. This plant is installed in an environment with a controlled atmosphere where, among other things, the humidity is maintained at less than 30 per cent.

Entering the environment, the sheets 1 of marble or the like are carried on a conveyor line 6 through a drying tunnel 7 where they are completely dried.

The sheets 3 of glass also, on entering the environment, are carried on a conveyor line 8 through a drying tunnel 9 where they are completely dried.

At the outlet from the drier 7, a film 4 of polyvinyl butyrate or equivalent material is applied to the sheet 1. The film 4 comes from a roll 10 which remains sealed until its introduction into the environment so as to be perfectly dry. The successive films 4 are detached from the roll 10 by means of a cutter with transverse blades 11.

For every sheet 1 covered with a film 4, a sucker transfer device 12 picks up a sheet 5 of glass from the conveyor line 8 and deposits it (arrow F) on the polyvinyl butyrate film 4 to form a sandwich 13.

The sandwich 13 passes through a tunnel oven 14 where it undergoes a first preheating to a temperature below that of softening of the polyvinyl butyrate. This temperature is about 40° C.

The first preheating has the object of increasing the volume of the air bubbles present between the layers 1, 3, 4 to facilitate their subsequent expulsion.

The expulsion of the air is achieved by rolling the sandwich 13 between rolls 15 covered with rubber or similar soft material. The rolling pressure is 2 kg per linear meter of width of the sandwich 13.

In this rolling stage, as in the subsequent one which will be mentioned below, the presence of the reinforcing layer 2 of good tensile strength is very useful and is quite essential in the case of thin sheets of marble (4 to 7 mm). Indeed, if the marble has structural discontinuities, the pressure of the rolls 15 could cause the marble sheets to break along the discontinuities.

When it leaves the rolls 15, the sandwich 13 passes through a further tunnel oven 17 on a conveyor line 16, and is subjected to a second preheating to a temperature corresponding the incipient softening of the polyvinyl butyrate. This temperature is about 65° C.

At the exit from the tunnel oven 17, the sandwich 13 is rolled between a pair of rolls 18 identical to the rolls 15. The pressure of the rolls 18 in this second rolling is also about 2 kg per linear meter of width of the sandwich 13.

The second preheating and the second rolling have the object of achieving incipient gluing of the three layers 1, 3, 4 with sealing of the edges of the sandwich.

After the second rolling, the sandwiches are conveyed (arrow G) to an autoclave 19 where they are housed in a vertical position and subjected to a final gluing treatment by means of heating under pressure to a temperature higher than that of softening of the polyvinyl butyrate.

The preferred cycle of the gluing treatment comprises the following steps:

progressive heating over 90 minutes from the ambient temperature to 120° C. under a pressure of 8 bars;

holding at 135° C. under a pressure of about 10 bars for a period of 30 minutes;

progressive cooling over a period of 30 minutes from 135° C. to 100° C. under a pressure of about 10 bars, and rapid cooling from 100° C. to 40° C. at a pressure of 10 bars (for several minutes) by means of cooling apparatus incorporated in the autoclave 19.

After this gluing treatment, the sandwiches have become composite slabs having the structure illustrated in FIG. 1 and are removed from the autoclave.

It has already been stated that the surfaces of the sheets of marble or the like which are intended to remain visible through the glass and the thermoplastics material may be left rough-cut or sawn. In this case, they may have a roughness which would not be acceptable in the case of a normal non-coated sheet for most ornamental uses. In a composite slab according to the invention, this roughness disappears for the same reason that the microscopic surface defects, such as those indicated 5 in FIG. 1, disappear.

As will be understood, the possibility of using rough-cut or sawn sheets is a considerable economic advantage, since it allows the onerous operation of preliminary polishing to be reduced.

The composite slabs obtained are generally intended to be used with their reinforcing layers 2.

For certain applications, however, it may be necessary to remove the reinforcing layer by means of abrasive tools.

The removal of the reinforcing layer 2 does not significantly reduce the strength of the composite slab since, even through the tensile strength given by this layer is lost, the relatively high tensile strength of the glass sheet 3 and a corresponding bending strength given by the sheet 3 still remain, at least if the bending is exerted in the direction in which the sheet 3 is stretched.

What is claimed is:

1. A composite slab for exterior facings on a building, interior decoration and the like comprising a thin sheet of natural stone having at least one rough unfinished face intended to be visible in use, a protective sheet of transparent glass overlying said rough unfinished face and a layer of transparent thermoplastics material interposed between said sheets and adhered to both sheets for connecting said sheets to define a composite slab wherein the thermoplastics material completely fills any surface defects in the rough unfinished face of said stone sheet so as to provide a smooth finished appearance to said surface of said stone sheet when viewed through said glass sheet and said layer of thermoplastics material while providing protection for said stone sheet against corrosion.

2. A composite slab as defined in claim 1 wherein said stone sheet has a thickness of less than 10 mm and further comprising a reinforcing layer of high tensile strength secured to the face of said stone sheet opposite said visible face.

3. A composite slab as defined in claim 2 wherein said reinforcing layer is comprised of a synthetic resin material reinforced with glass fibres.

* * * * *